United States Patent [19]
Hsu

[11] Patent Number: 5,656,063
[45] Date of Patent: Aug. 12, 1997

[54] AIR CLEANER WITH SEPARATE OZONE AND IONIZER OUTPUTS AND METHOD OF PURIFYING AIR

[75] Inventor: Maxwell Hsu, Taoyuan Hsien, Taiwan

[73] Assignee: Airlux Electrical Co., Ltd., Taiwan

[21] Appl. No.: 615,332

[22] Filed: Jan. 29, 1996

[51] Int. Cl.$^6$ ........................................................ B03C 3/36
[52] U.S. Cl. .................................. 95/58; 55/279; 95/63; 96/25; 96/58; 96/59; 96/74; 96/97; 422/4; 422/5
[58] Field of Search ........................ 55/279, DIG. 39; 96/16, 17, 55–59, 74, 25, 97; 95/58, 63; 422/4, 5

Related U.S. Application Data

[63] Continuation of PCT/IB95/01161, Nov. 30, 1995.

[56] References Cited

U.S. PATENT DOCUMENTS

| | | | |
|---|---|---|---|
| 977,335 | 11/1910 | Shaffner | 96/63 |
| 977,336 | 11/1910 | Shaffner et al. | 422/186.15 |
| 1,049,775 | 1/1913 | Spaulding | 422/186.1 |
| 2,142,128 | 1/1939 | Hoss et al. | 96/66 |
| 2,205,831 | 6/1940 | Hartman | 55/279 X |
| 2,225,677 | 12/1940 | White | 96/66 |
| 2,249,801 | 7/1941 | White | 95/75 |
| 2,297,933 | 10/1942 | Yonkers, Jr. | 55/279 X |
| 3,215,616 | 11/1965 | Spielman | 55/279 X |
| 3,250,915 | 5/1966 | Schmitt | 55/279 X |
| 3,511,030 | 5/1970 | Hall et al. | 96/25 |
| 3,696,269 | 10/1972 | Hochheiser et al. | 361/231 |
| 4,244,712 | 1/1981 | Tongret | 55/279 X |
| 4,507,131 | 3/1985 | Fathauer et al. | 323/903 X |
| 4,516,991 | 5/1985 | Kawashima | 96/55 |
| 4,781,736 | 11/1988 | Cheney et al. | 96/60 |
| 4,902,306 | 2/1990 | Burnett et al. | 96/58 X |
| 4,955,991 | 9/1990 | Torok et al. | 96/50 |
| 5,045,095 | 9/1991 | You | 96/80 |
| 5,055,115 | 10/1991 | Yikai et al. | 96/59 |
| 5,185,015 | 2/1993 | Searle | 96/16 |
| 5,302,190 | 4/1994 | Williams | 95/57 |
| 5,330,559 | 7/1994 | Cheney et al. | 95/63 |
| 5,350,443 | 9/1994 | von Blucher et al. | 55/DIG. 39 |
| 5,445,798 | 8/1995 | Ikeda et al. | 422/121 |
| 5,454,859 | 10/1995 | Chiba et al. | 96/18 |

FOREIGN PATENT DOCUMENTS

| | | | |
|---|---|---|---|
| 3905842 | 9/1989 | Germany. | |
| 55-157349 | 12/1980 | Japan. | |
| 63-291655 | 11/1988 | Japan. | |
| 6-285388 | 10/1994 | Japan | 55/279 |
| 473144 | 10/1937 | United Kingdom | 55/279 |

*Primary Examiner*—Richard L. Chiesa
*Attorney, Agent, or Firm*—Fields & Johnson, P.C.

[57] ABSTRACT

An air cleaner with separate ozone gas and ionized air outputs, and method of purifying air is provided. The air cleaner includes an exterior housing which houses an ozone generator component and a ionized air generator component. In operation, air is drawn through the air cleaner by means of a blower and is first passed through a multi-layered filter. The air then passes through an ionizer which ionizes the air and induces on it a net negative electric charge. As the ionized air is recirculated back into the device, the negatively charged air is electrostatically precipitated by the filter which maintains a net positive electric charge. The ozone generator component within the housing draws in air via an air pump which produces an output of pressurized air to the ozone generator. Within a mixing chamber of the ozone generator, the pressurized air is mixed with ozone produced therein and is then output through an independent ozone outlet tube. The ozone and ion generators may be operated simultaneously or separately wherein surrounding air is electrostatically precipitated and/or mixed with ozone gas. Alternatively, an extension tube is connectable to the ozone outlet tube to enable a concentrated ozone mixture to be applied to a remote location. A timer circuit within the apparatus enables the ozone generator to be controlled to shutdown at a preset time.

10 Claims, 5 Drawing Sheets

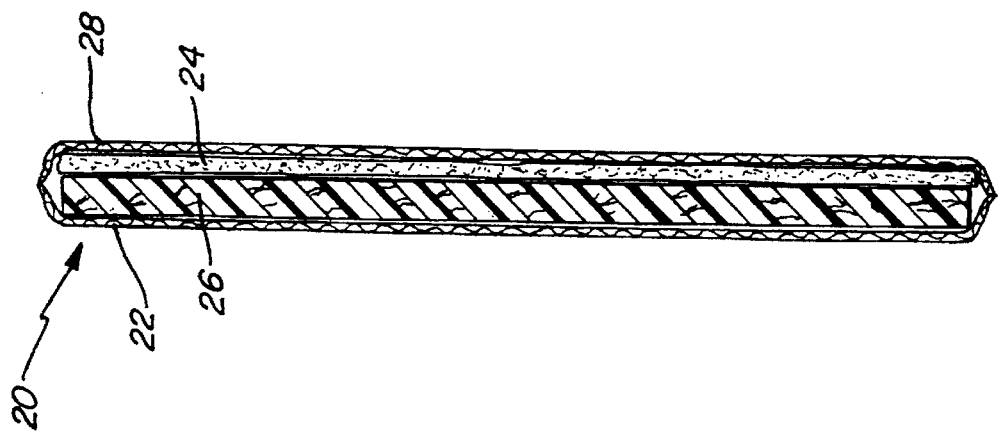
Fig_1A
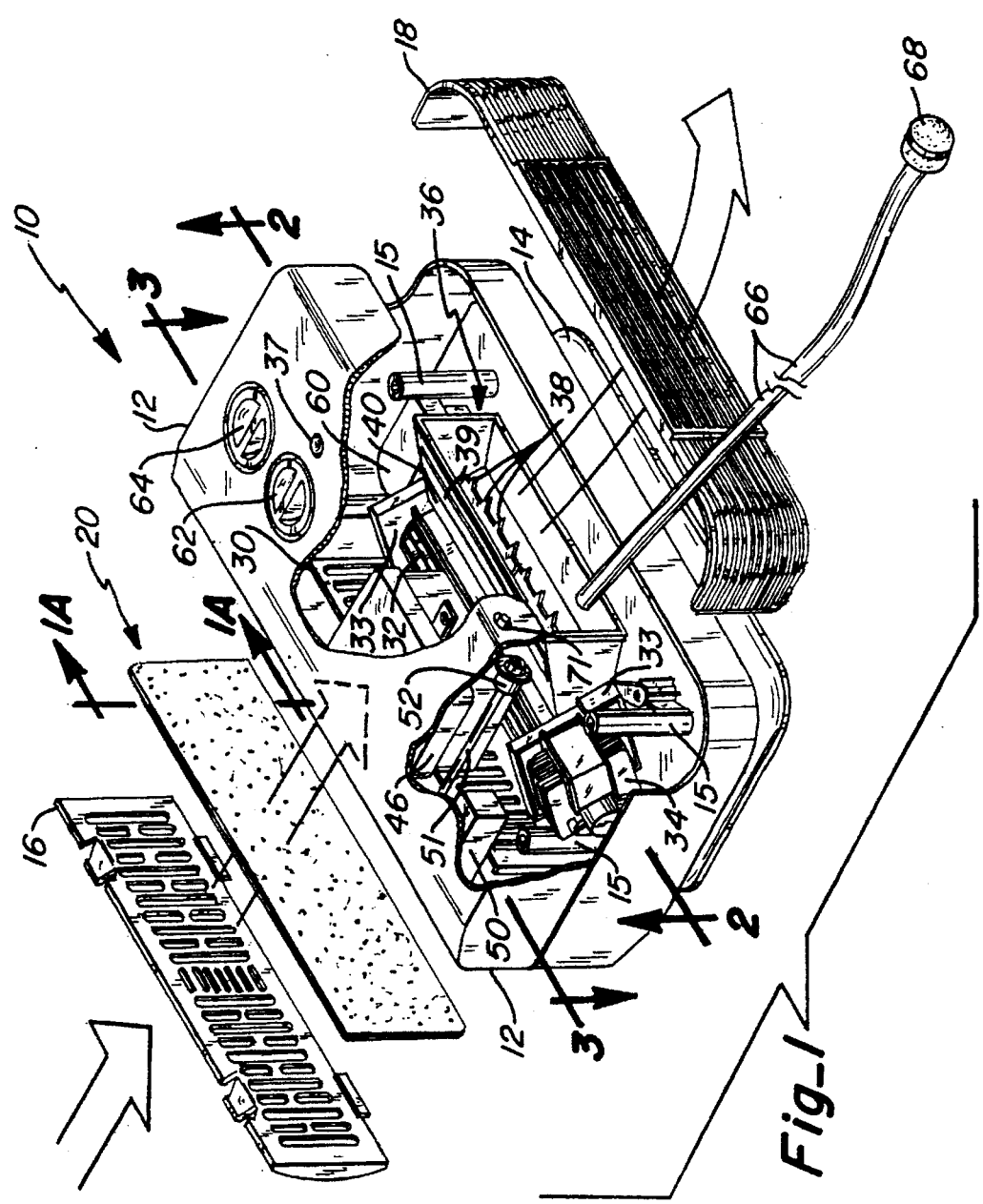
Fig_1

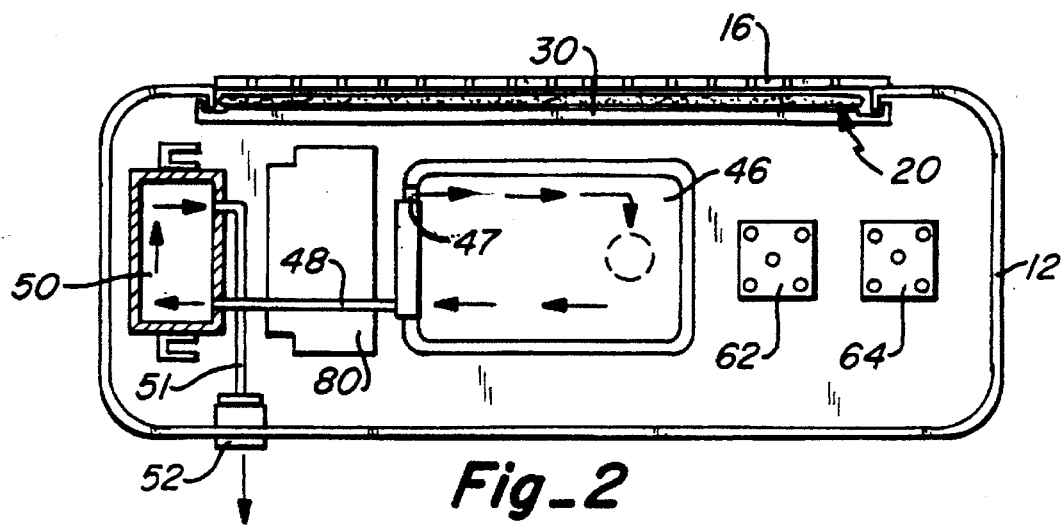
Fig_2
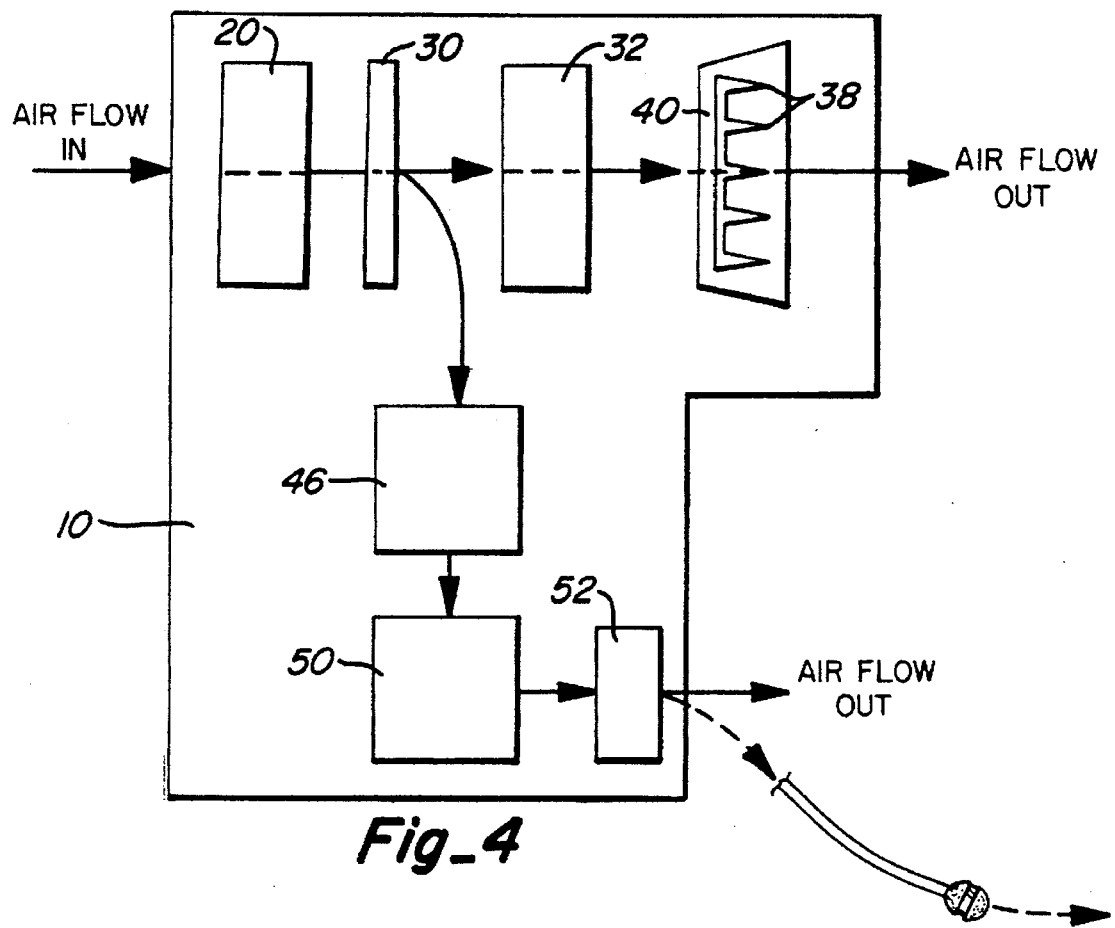
Fig_4

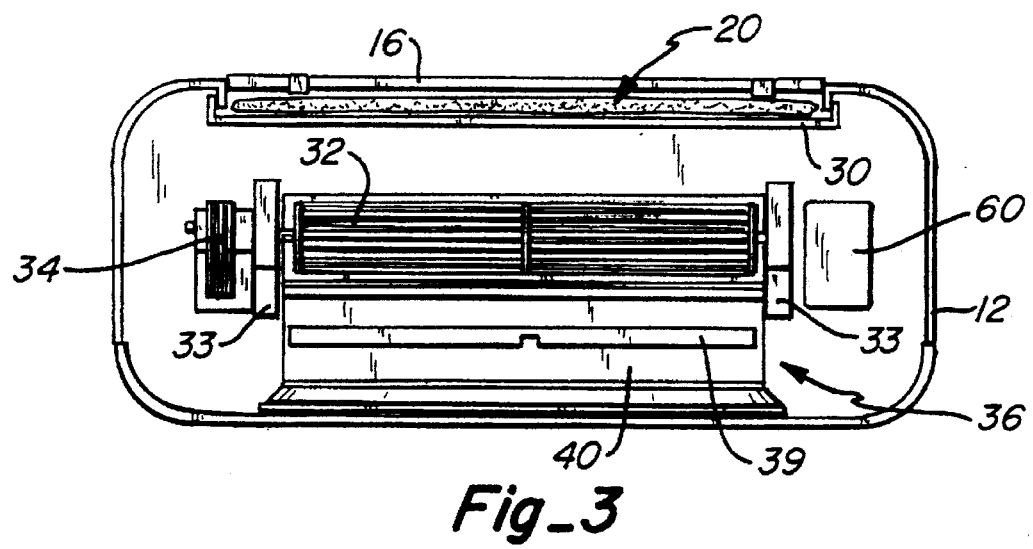
Fig_3
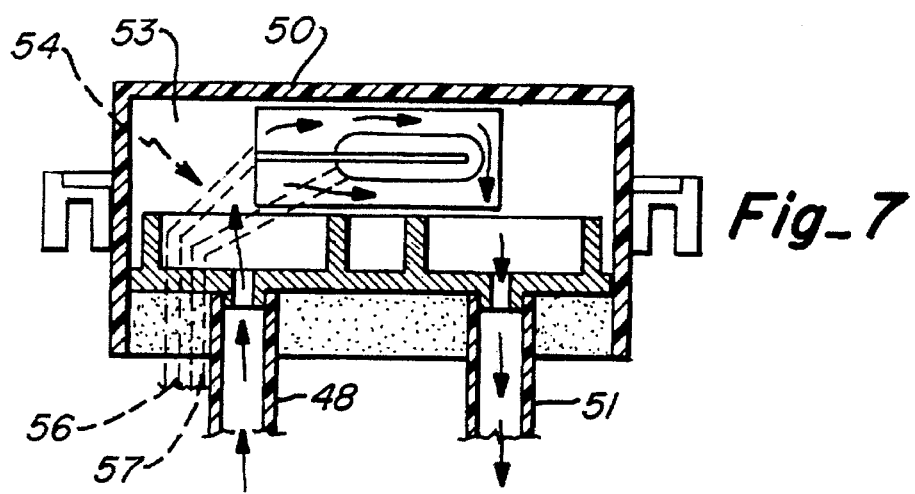
Fig_7
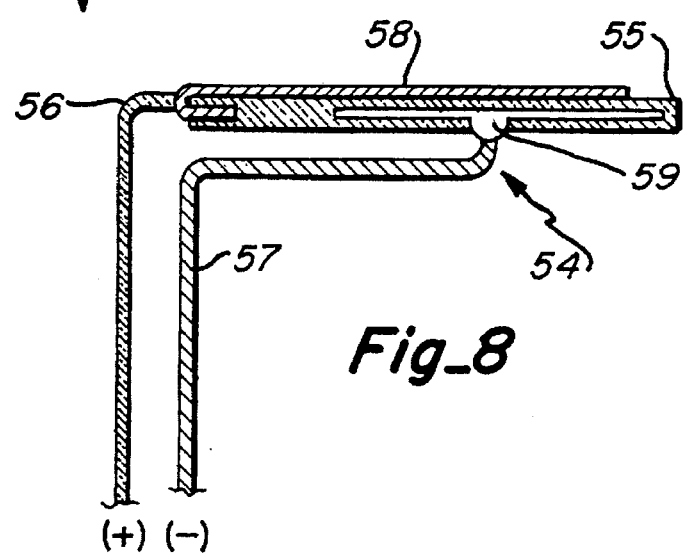
Fig_8

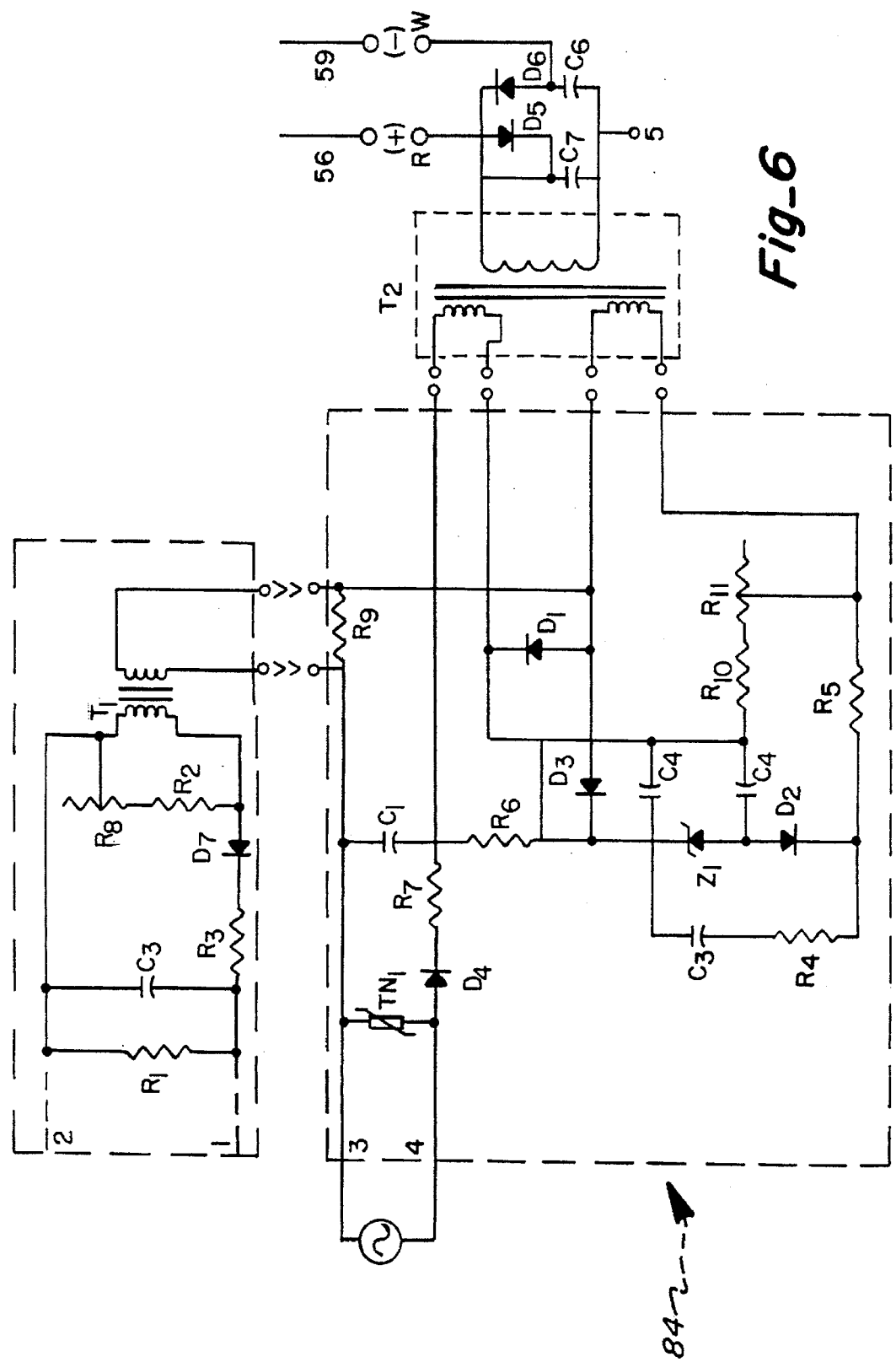
Fig_6

AIR CLEANER WITH SEPARATE OZONE AND IONIZER OUTPUTS AND METHOD OF PURIFYING AIR

This application is a continuation of Application No. PCT/IB95/01161, filed on Nov. 30, 1995.

TECHNICAL FIELD

This invention relates to an apparatus and method for cleaning and purifying air by means of an air cleaner having separate ozone gas and ionized air outputs.

BACKGROUND ART

Many devices exist for electrostatically precipitating contaminants from the air. There are also a number of devices directed toward the creation of ozone to help clean and purify the air. Electrostatic precipitation is particularly effective for removing particulate impurities from the air. By passing contaminated air successively through an electrostatic air filter, the particulate matter can be effectively removed. However, the problem of odors resulting from stale tobacco, body perspiration and the like is not remedied by electrostatic precipitation. Accordingly, the use of an ozone gas generator which supplies ozone to the air has been proven effective in oxidizing micro-organisms such as bacteria to kill the same which eliminates odors.

U.S. Pat. No. 4,244,712 to Tongret teaches an air cleansing system using treated recirculating air. The system comprises a portable housing having an air entrance and air exit openings. The housing incorporates an electrostatic air cleaner, a charcoal filter, an ozone gas generator and a negative ion generator to provide treated air having ozone and negatives ions and wherein the electrostatic cleaner and charcoal filter physically and chemically remove impurities from the air.

Another example of a prior art reference which is utilized to clean surrounding air is U.S. Pat. No. 4,049,400 to Bennett et al. This invention discloses an air purifying apparatus having an ozone generator and an electrostatic filter. The air purifier includes two charge carrying plates abutting opposite sides of a planar dielectic layer along the entire width of each plate, one of the plates being relatively narrow in width in comparison to the other plate. The plate configuration prolongs the life of the dielectric layer and permits easy cleaning of the air purifier.

U.S. Pat. No. 4,516,991 to Kawashima discloses an air cleaning apparatus including a plurality of dust collecting electrodes alternately arranged with panel electrodes and spaced from each other at predetermined intervals to form air flow passages. The intervals between the panel electrodes and the dust collecting electrodes are selected to maintain a predetermined potential gradient in response to the value of the voltage applied between the panel electrodes and the dust collecting electrodes, whereby corona discharges are generated between the dust collecting electrodes and the ionizing wires to produce air streams.

U.S. Pat. No. 5,055,115 to Yikai et al. teaches an air cleaner including an electric precipitating apparatus that employs corona discharge and an ozone removing apparatus downstream of the precipitating apparatus. The ozone removing apparatus has a carbon filter, and is charged with a low positive voltage to remove ozone generated by the precipitating apparatus by chemical conversion to oxygen and carbon dioxide.

Other examples of prior art which are representative of methods and apparatuses used for the electrostatic precipitation of contaminants in the air and/or the use of ozone to clean the air are disclosed in U.S. Pat. No. 5,454,859, U.S. Pat. No. 5,302,190, U.S. Pat. No. 5,330,559 and U.S. Pat. No. 5,045,095.

Although each of the foregoing references disclose devices and processes which are satisfactory for their intended purposes, none of the references disclose a method or apparatus for cleaning air in the manner that is claimed herein.

DISCLOSURE OF THE INVENTION

The present invention contemplates a method and apparatus for cleaning and purifying air wherein an air cleaner device produces separate outputs of ozone gas and ionized air. As is well understood in the art, electrostatic precipitation of particulates suspended in the air may occur when the particulates are subject to a net negative or positive electric charge, and then are collected on a filter or collection device which has a net opposite electric charge. Further cleaning of air may occur when the air is subject to the corona discharge created by oppositely charged elements having a dielectric material disposed therebetween. The corona discharge takes the form of ozone gas which serves to oxidize contaminants such as bacteria or other micro-organisms suspended in the air, which in turn destroys undesirable odors associated therewith. In the present invention, the beneficial aspects of selective and independent electrostatic precipitation and creation of ozone are combined into one apparatus.

More specifically, the apparatus of this invention includes an exterior housing which houses an independent ozone generation component and an independent ionizer component. In operation, surrounding environmental air is drawn through the apparatus by a blower, passes through an ionizing manifold wherein a plurality of spaced discharge needles create an electrostatic field which induces a net negative charge on the air, and then the ionized air is forced back into the surrounding environment by the force of the blower. As the ionized air recirculates back into the apparatus, the ionized air having the net negative charge is electrostatically filtered when coming into contact with a filter unit which has a net positive charge. The continuing recirculation of air through the apparatus wherein the air is repeatedly subject to the electrostatic precipitation results in a purifying effect upon the air by removing the undesirable particulates.

The ozone gas generator component of this invention includes a pump which draws air into an ozone mixing chamber having a corona discharge unit and then discharges the air mixed with ozone through an outlet.

A power switch controls the production of ionized air through the ion generator and a separate function switch controls the output of ozone from the apparatus. A timer circuit incorporated within the electronics of the device automatically deenergizes the ozone generator at a predetermined time to prevent excessive amounts of ozone gas from being introduced into the surrounding air. Excessive ozone in the air has been found to be an irritant and is therefore counterproductive to its beneficial oxidizing effect in killing micro-organisms. Ozone may be directly pumped into the surrounding environmental air through an outlet fitting, or a tube extension may be connected to the outlet fitting in order that concentrated amounts of the air and ozone mixture may be applied directly to a remote location. One advantage of the foregoing invention is that the air and ozone mixture may be output simultaneously with the ionized air, or the mixture may be selectively separated from the ionized air and applied to a specific area remote from the ionized air. For example, for purposes of deodorizing a closely confined space such as a cabinet or the like, the tube extension may enable the ozone mixture to be directly applied to the area in order to deodorize particularly odorous areas within the cabinet caused by bacteria growing therein. That is, the ozone mixture applied by the tube extension provides a concentrated amount of ozone to more effectively provide deliberate deodorization of targeted areas. The tube exterior can also be placed in water to help disinfect the water which may be used for washing vegetables or the like. Additionally, the tube extension can be placed in close proximity to items like fruits and vegetables in order to cleanse them by exposure to the ozone gas.

Because of the compact construction of the apparatus of this invention, the apparatus is ideally suited for use in the home or office. Additionally, the combination of the ion generator and ozone generator within the same apparatus prevents having to utilize a separate electrostatic precipitator and ozone generator to achieve the same dual air cleaning function.

Another important advantage of this invention is that ozone is generated inside the same mixing chamber through which the circulating air is pumped. The advantage of exposing the circulated air to the location at which ozone is created is that a high temperature zone is created within the mixing chamber itself. This high temperature zone is very destructive to bacteria and is more effective than ozone treated air at ambient temperatures. Furthermore, in addition to the beneficial effects of ozone in killing bacteria through oxidation, the ozone itself will convert common chemicals having an unpleasant odor to less volatile species which can be more easily absorbed in the filter unit. For example, aldehydes are converted to fatty acids, amines to amides or amine oxides, mercaptans to sulphinic acids and non-saturated hydrocarbons to ozonides.

Additional advantages of this invention will become apparent from the description which follows, taken in conjunction with the accompanying drawings.

BRIEF DESCRIPTION OF THE DRAWINGS

FIG. 1 is a partially exploded fragmentary, perspective view of the air cleaner of this invention;

FIG. 1A is a vertical section view of the filter unit of the apparatus of this invention taken along line 1A—1A of FIG. 1;

FIG. 2 is a plan view of the apparatus of this invention taken along line 2—2 of FIG. 1;

FIG. 3 is a plan view of the apparatus of this invention taken along line 3—3 of FIG. 1;

FIG. 4 is a schematic block diagram illustrating the basic functioning of the apparatus of this invention;

FIG. 6 is a schematic circuit diagram of the high voltage circuit used in conjunction with the ozone generator of this invention;

FIG. 7 is a schematic diagram of the ozone generator of this invention illustrating the flow of air within the ozone mixing chamber of the ozone generator; and FIG. 8 is an enlarged schematic diagram of the corona discharge unit of the ozone generator.

BEST MODE FOR CARRYING OUT THE INVENTION

Figure 5:
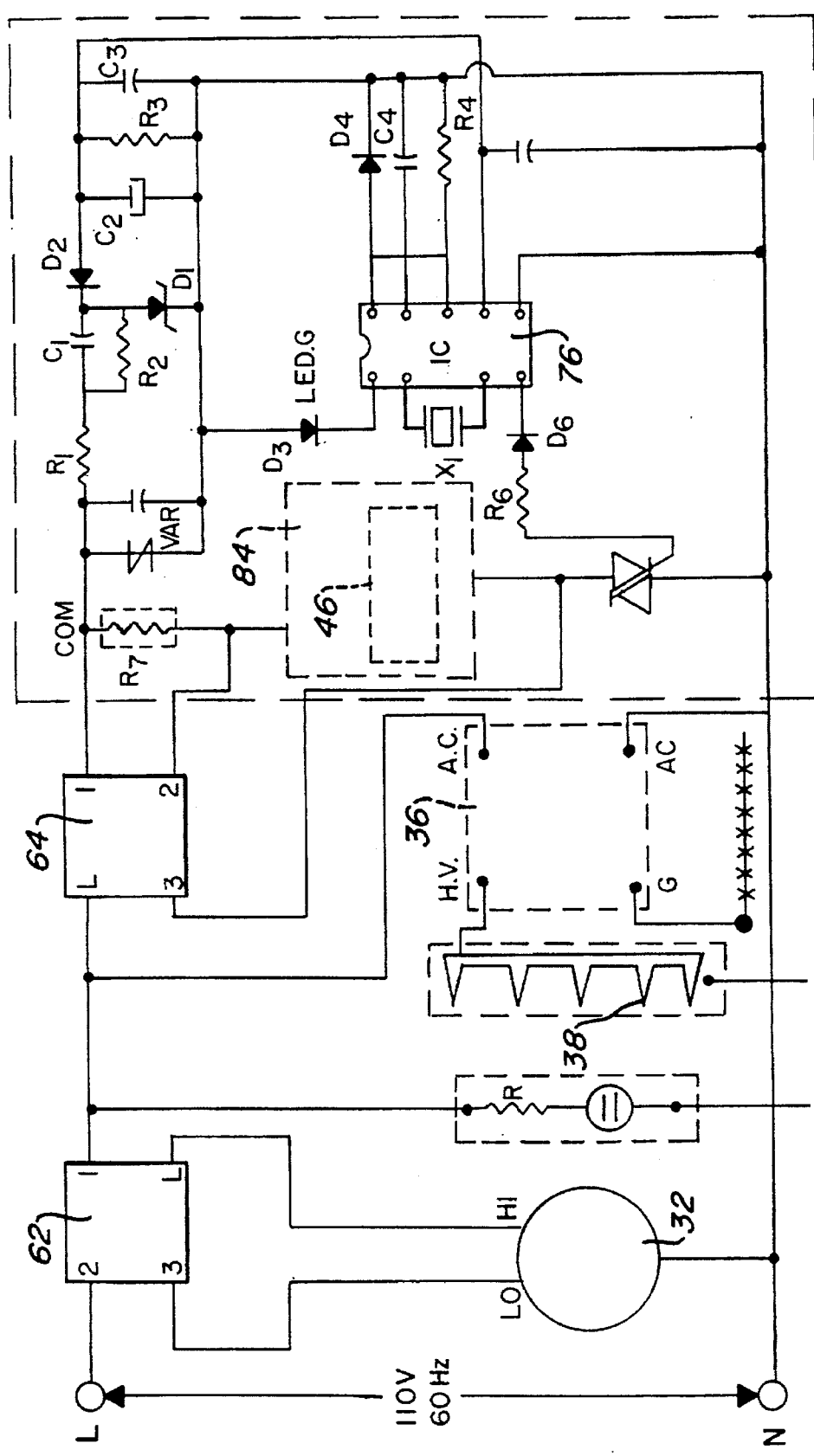
FIG. 5 is a schematic circuit diagram of the apparatus of this invention illustrating the major component elements including the blower, ion generator, control switches, ozone generator and timer circuit.

In accordance with this invention, as shown in FIG. 1, an apparatus is provided for cleaning and purifying air utilizing separate ozone and ionized air outputs. The apparatus 10 of this invention includes an exterior housing 12 which may be formed of extruded or molded material such as plastic. Attached to the bottom surface of the housing 12 is a base unit 14 which stabilizes the air cleaner 10 in an upright position. A plurality of connecting means 15 are provided to join the upper and lower sections of the exterior housing 12. On the front face of the housing 12 is an outlet grate 18 which includes a plurality of holes or slots enabling circulated air to be passed therethrough. On the rear face of the housing 12 is attached accumulator grate 30. Positionable against and exteriorly of grate 30 is filter unit 20 which is used for mechanically and electrostatically filtering out impurities from circulated air. Inlet grate 16 is removably mounted exteriorly of filter unit 20. Inlet grate 16 also includes a plurality of holes or slots enabling circulated air to be passed therethrough. Inlet grate 16 holds the filter unit 20 in place against the accumulator grate 30. As shown in FIG. 1A, the filter unit 20 may comprise a plurality of layers designed to filter impurities within the air. In the preferred embodiment, filter unit 20 may include a first polypropelene fiber filter layer 22, a 3M® static electricity fiber filter layer 24, an activated carbon filter layer 26 and a second polypropelene fiber filter layer 28. As shown, layers 22 and 28 are on opposite and exterior sides of the filter unit 20 with the layers 24 and 26 disposed therebetween.

Blower 32 is mounted within the housing 12 adjacent the accumulator grate 30. As illustrated, blower 32 may be of the cylindrical rotary-type which is driven by blower motor 34. Blower mount structure 33 serves to hold blower 32 in place.

Adjacent to blower 32 and opposite accumulator grate 30 is positioned the ion generator 36. Ion generator 36 includes a discharge manifold 40 which contains a plurality of discharge needles 38. Charge distribution plate 39 is mounted on the discharge manifold 40 and electrically communicates with discharge needles 38.

Electrostatic precipitation of contaminants such as particulates suspended in the surrounding air is achieved by use of the filter unit 20, accumulator grate 30 and ion generator 36. In operation, as seen in FIGS. 1 and 4, the blower 32 draws in surrounding air through inlet grate 16 and through filter unit 20. Air continues to pass through the interior of the housing 12 until it reaches the opening of discharge manifold 40 positioned adjacent the outlet side of blower 32. As the air passes through the manifold 40, the discharge needles 38 create an ionized field which induces a net negative electric charge on the air passing therethrough. The air finally exits the housing 12 through outlet grate 18 and back into the surrounding environment. The blower 32 continues to operate which causes the ionized air to eventually recirculate back into the interior of the housing 12. As the ionized air is redrawn back into the housing 12, it contacts filter unit 20 which carries a net positive charge as induced upon it by accumulator grate 30. As will be discussed further below, accumulator grate 30 is connected electrically to the circuitry of the apparatus and carries a net positive charge. The filter unit 20 maintains physical contact with accumulator grate 30 causing the filter unit 20 to also maintain a net positive charge. Accordingly, filter unit 20 is able to electrostatically precipitate the negatively charged particles passing therethrough. More specifically, the 3M® static electricity fiber filter layer 24 is specially suited for maintaining a positive charge to help electrostatically precipitate particulates. Fiber filter layers 22, 26 and 28 serve to electrostatically and mechanically filter out impurities in the air as well. Therefore, the filter unit 20 has both mechanical filtration capabilities and electrostatic capabilities. Due to the construction of the ion generator 36, a minimum of ozone gas is produced by the ion generator. That is, the ionization of the air is achieved without necessarily producing an arc discharge within the air itself, thus greatly minimizing the amount of ozone produced relative to the concentration of ionized air. While some residual amount of ozone may be produced by the ion generator 36, the function of producing concentrated amounts ozone is specifically achieved by the ozone generator 50.

As shown in FIGS. 2 and 4, air pump 46 draws air through pump inlet 47 and then forces air out through pump outlet tube 48. Pump outlet tube 48 communicates with the inlet of ozone generator 50. Typically, the air pressure created by pump 46 is on the magnitude from 0.1 to 0.9 kilograms/cm$^2$. Once the air has entered the ozone generator 50, it is mixed in the ozone mixing chamber 53 with ozone produced therein, and then the mixture of ozone and air is output through ozone outlet tube 51 which connects with outlet fitting 52.

As shown in FIGS. 7 and 8, the creation of ozone is achieved by corona discharge unit 54. Corona discharge unit 54 includes a positively charged high voltage input 56 which connects to a wire-type high voltage discharge pole 58. Corona discharge unit 54 further includes a negatively charged high voltage input 57 which is connects to a corresponding plate-type induction pole 59. As will be discussed below, the high voltage inputs 56 and 57 are created by the high voltage circuit 84 illustrated in FIG. 6. In operation, pulse voltages at frequencies between 19 to 25 kilohertz (Khz) and at magnitudes between 4.5 to 7 kilovolts (Kv) are provided to inputs 56 and 57. Disposed between and around discharge pole 58 and induction pole 59 is a dielectric material 55 such as a ceramic. The interaction of the oppositely charged high voltage poles along with the dielectric 55 results in the creation of a corona discharge in the form of ozone gas.

As shown in FIG. 7, the circulation of air around the corona discharge unit 54 within mixing chamber 53 results in a mixture of air with the ozone. Because of the confined space of the mixing chamber 53, a very effective mixing of the air takes place with the generated ozone. The confined mixing space coupled with the pressurized air passing through the mixing chamber 53 is a more advantageous method of providing concentrated ozone mixture than simply venting ozone to a larger area wherein mixing is less effective. Through experimentation, it has been found that the optimum ozone output of the ozone generator in order to provide an adequate amount of ozone and yet not an excessive amount which may be noxious is an output of between 80 and 150 mdg/hour.

As shown in FIG. 5, power is provided to the apparatus of this invention by a common 110 volt 60 hertz source. Power switch 62 includes a high and low setting which controls blower 32. Power switch 62 also controls power to the ion generator 36. Function switch 64 includes a high and low setting and controls power to the timer circuit 74, and to the high voltage circuit 84 illustrated in FIG. 6 which in turn provides power to the air pump 46 and the high voltage inputs 56 and 57 of the ozone generator 50. Timer circuit 74 is used to control the length of time that the ozone generator 50 operates when energized. Typically, the timer can be set for a 60 minute run time at which time the timer will then deenergize the ozone generator 50. However, integrated circuit chip 76 can be programmed to provide different run times which best suit the needs of the particular application of the apparatus. To reset the timer circuit 74, power switch 62 may be turned on and off to begin the desired timing sequence.

As shown in FIG. 6, the high voltage circuit 84 of this invention is primarily composed of a high frequency oscillating transistor $Q_1$ and step up transformers T1 and T2. As shown, a standard power source is received at 110 volts and 60 Hz. The high frequency oscillating function of the circuit greatly increases the frequency to between the range of 19 to 25 Khz. Then, transformers T1 and T2 convert the high frequency oscillating voltage into pulses of positive high voltages via diode D5 and capacitor C7 and into pulses of negative high voltages via diode D6 and capacitor C6 to output terminals R and W. In the preferred embodiment, it has been found in order to provide the low and high settings on function switch 64 corresponding to low and high ozone generation output, T1 converts the voltage to 4.5 Kv (pulse to pulse voltage) and transformer T2 converts the voltage to 7 Kv (pulse to pulse voltage). High voltage input 56 connects with terminal R and high voltage input 57 connects with terminal W thus providing the necessary high voltage to create the ozone within the ozone generator 50. Manipulating function switch 64 enables high and low ozone generation corresponding to 7 Kv/25 Khz and 4.5 Kv/19 Khz, respectively. Typically, the low ozone output setting of switch 64 is chosen when purifying the surrounding air and the high setting is chosen when using the extension tube 66, as explained below.

In order for an operator to know that the ion generator 36 and the ozone generator 50 are energized, corresponding outlet LEDs 37 and 71 are provided which indicate an energized condition.

In some applications, it may be desirable to output the ozone mixture along with the ionized air. In such circumstances, outlet fitting 52 may be left free to communicate with the surrounding air. In other circumstances, it may be desirable to route the ozone mixture to a remote location. Conveniently, extension tube 66 and gas distribution means 68 are provided to enable the ozone mixture to be applied to the remote location. Means 68 is provided to prevent undesirable materials from clogging tube 66 yet provides passage of the gaseous ozone air mixture. In use, extension tube 66 and means 68 may be placed in water to purify it. Alternatively, tube 66 and means 68 may be placed in close proximity to confined spaces to eliminate odors or to sanitize objects such as fruits and vegetables. Means 68 may take the form of a cintered filter or any suitable gas distribution fitting which directs pressurized gas to a desired location and prevents entry of objects large enough to block tube 66.

Since two independent switches are provided which respectively control the creation of ozone and ionized air, an operator may choose to either purify the air solely by electrostatic precipitation or may wish to separately or simultaneously provide ozone to the surrounding air or to targeted objects.

As seen in FIGS. 1 and 2, the high voltage circuit 84 illustrated in FIG. 6 is housed within high voltage generator 60. Similarly, the timer circuit 74 is embodied by circuit board 80.

This invention has been described in detail with reference to particular embodiments thereof, but it will be understood that various other modifications can be effected within the spirit and scope of this invention.

I claim:

1. An apparatus for purifying air in a desired area, said apparatus comprising:

an ion generator for producing an ionized field which ionizes air passing therethrough by inducing a net negative electric charge thereon;

a blower positioned adjacent said ion generator for continually circulating the air through said apparatus to the desired area;

a filter unit attached to said apparatus and juxtaposed to said ion generator, said filter unit having a net positive electric charge which electrostatically precipitates recirculated air having a net negative electric charge reentering said apparatus from the desired area;

an air pump placed downstream of said filter unit and attached to said apparatus, said air pump including an inlet and outlet, said inlet for drawing air into said pump and said outlet for passing air outwardly therefrom in a pressurized state;

an ozone generator having an inlet connected to said air pump outlet for receiving pressurized air from said air pump, said ozone generator further having an outlet through which a mixture of air and ozone pass; and ozone output means attached to said outlet of said ozone generator for providing selective and independent output of the mixture to the desired area.

2. An apparatus, as claimed in claim 1, further including:

an accumulator attached to said apparatus, said accumulator having a net positive electric charge for transferring the net positive charge onto said filter unit.

3. An apparatus, as claimed in claim 1, wherein said filter unit further includes:

at least one fiber layer;

at least one activated charcoal layer positioned adjacent said at least one fiber layer; and at least one electrostatic filter layer placed adjacent said activated charcoal layer, said filter unit providing electrostatic and mechanical filtering of air passing therethrough.

4. An apparatus, as claimed in claim 1, wherein said ozone output means further includes a fitting mounted on said apparatus and an extension attachable thereto for providing directed placement of the mixture to a remote location.

5. An apparatus, as claimed in claim 1, wherein said ion generator further includes:

a discharge manifold; and a plurality of spaced discharge tips disposed therein, said discharge tips producing a substantially uniform ionized field across an opening defined by said manifold.

6. An apparatus for purifying air, said apparatus comprising:

means for producing an ionized field which ionizes air passing therethrough and induces a net negative electric charge thereon;

means positioned adjacent said ion generator means for continually circulating the air through said apparatus;

means attached to said apparatus and juxtaposed to said ionized field producing means for filtering the air passing therethrough, said filtering means having a net positive electric charge which electrostatically precipitates recirculated air having a net negative electric charge which reenters said apparatus;

means downstream of said filtering means and attached to said apparatus for pumping air from a first location to a second location in a pressurized state;

means communicating with said second location for generating ozone, said ozone generating means having an inlet communicating with said second location and remote from said air circulating means, said ozone generating means including an outlet through which a mixture of air and ozone pass; and means communicating with said outlet of said ozone generating means for outputting ozone selectively and independently of said ion generator means.

7. An apparatus, as claimed in claim 6, further including:

timer means communicating with said ozone generating means for denergizing said ozone generating means at a predetermined time.

8. A method for purifying air of a desired area, said method comprising:

circulating air though a housing;

exposing a first portion of the air to an ionized field in order to ionize the first portion of air;

pumping a second portion of air away from the first portion;

mixing the second portion of air remote from the first portion of air with ozone gas after pumping;

electrostatically precipitating impurities from the first portion of air by an electrostatic filter;

outputting the first portion of air from the housing to the desired area; and outputting the second portion of air from a remote location on the housing to the desired area.

9. A method, as claimed in claim 8, further including the step of:

providing an extension means for outputting the second portion of air to another desired area.

10. A method, as claimed in claim 8, including the further step of:

providing an extension means including a gas distribution means at a distal end thereof for outputting the second portion of air to another desired area.

* * * * *